United States Patent [19]

Kneupel et al.

[11] 3,744,038

[45] July 3, 1973

[54] SUPERCONDUCTING LEARNING MATRIX

[75] Inventors: Hans-Joachim Kneupel, Dresden; Bernd Steffin, Langebruck, both of Germany

[73] Assignee: VEB Kombinat Robotron, Radeberg, Germany

[22] Filed: July 9, 1971

[21] Appl. No.: 161,003

[52] U.S. Cl. .............. 340/173.1, 307/212, 307/245, 307/306, 340/166 SC

[51] Int. Cl. . G11c 11/44, G11c 27/00, H03k 25/00

[58] Field of Search .................. 340/173.1, 166 SC; 307/306, 245, 212

[56] References Cited

UNITED STATES PATENTS

| | | | |
|---|---|---|---|
| 2,958,848 | 11/1960 | Garwin | 340/173.1 X |
| 3,418,642 | 12/1968 | Davies | 340/173.1 |
| 3,196,427 | 7/1965 | Mann | 307/306 X |

*Primary Examiner*—Bernard Konick
*Assistant Examiner*—Stuart Hecker
*Attorney*—Albert C. Nolte, Jr. et al.

[57] ABSTRACT

A superconducting learning matrix in which the coupling cells at the matrix intersections include a write cryotron controlled by the row lines for activating the storage cells, and a coupling cryotron for coupling the column lines either to the row lines or word recognition lines for reading out of the cell. The storage cells are activated according to a geometric series. The coupling cryotrons may also be controlled by a blocking line, and additional switching cryotrons may be provided for insuring constant current in taught cells. In a further embodiment, a complementary matrix may also be provided.

9 Claims, 10 Drawing Figures

PATENTED JUL 3 1973 3,744,038

SHEET 1 OF 5

INVENTORS
HANS-JOACHIM KNEUPEL
BERND STEFFIN

BY Nolte & Nolte
ATTORNEYS

INVENTORS
HANS-JOACHIM KNEUPEL
BERND STEFFIN
BY Nolte & Nolte
ATTORNEYS

INVENTORS
HANS-JOACHIM KNEUPEL
BERND STEFFIN
BY Nolte & Nolte
ATTORNEYS

INVENTORS
HANS-JOACHIM KNEUPEL
BERND STEFFIN
BY Nolte & Nolte
ATTORNEYS

INVENTORS
HANS-JOACHIM KNEUPEL
BERND STEFFIN

BY Nolte & Nolte
ATTORNEYS

SUPERCONDUCTING LEARNING MATRIX

This invention relates to superconducting learning matrices, and is more particularly directed to such a matrix suitable for adaptation processes in the automatic recognition of patterns, characters and speech, and in computers.

Learning matrices are information classification systems which represent the next highest development above interpreting devices. Learning matrices differ from interpreters, or set value storages, in that they have no rigid classification network, but can build the classification network only by adaptation during the learning phase. In the subsequent stored phase of a learning matrix, the learning matrix functions as a pure interpreter system. In a learning matrix, it is thus possible to technically simulate the learning process as an internal process of adaptive behavioral change, based upon experience, in disturbed or changing environmental situations. This adaptation process is realized in the learning phase of a learning matrix by quantitative changes of state of the coupling elements between row and column lines. When these quantitative changes of state become qualitative changes of state, the learning phase is completed and the stored information phase is initiated.

Conductance coupled, transfluxor coupled, and capacitance coupled learning matrices are well known, as are superconductive set value storages having a crossbar distribution panel and a superconductive learning circuit. In previously employed superconductive set value storages, the coupling between the column and row lines is effected by the cryotron which is adapted to be switched by an indirectly controlled storage cell, depending upon the stored information, to a superconductive or normally conductive state. Previously known superconductive learning circuits employed flip-flop circuits interconnected so that the current was switched in steps from one flip-flop branch into another flip-flop branch, to obtain a learning effect. The switching time of the flip-flop was made greater than the pulse time of the pulses controlling the switching, in one of the flip-flop branches, by employing an additional inductance therein, in order to achieve the stepwise switching.

Integral production of most of the previously known learning circuits was not possible, since they were comprised of different elements, or must be wired or threaded. For example, a matrix could not be built of the known superconducting learning circuits, without relatively great expenditure. In addition, in some cases, the state of change of the coupling elements is not reversible. For example, in capacitance coupled matrices, and in some conductance coupled learning matrices, the learning can only be progressive, and not regressive (to affect a "forgetting" function). The change of state is not reproducible in every case without difficulty. Thus, for example, the capacitive change of state in capacitance coupled learning matrices can be achieved by burning through the capacitance coats, which, as is known, is a statistical process.

It is therefore an object of the invention to provide a superconductive learning matrix in which all of the elements may be economically produced with relatively small construction costs, in which the reversibility and reproducibility of the learning process is insured, and in which the number of learning steps can easily be varied. The invention is therefore directed to an improved circuit for a superconducting learning matrix, and to a method of operating the matrix.

According to the invention, a superconducting learning matrix is provided with coupling cells for coupling the column lines with the row lines. The coupling cells are comprised of directly controlled superconducting constant current cells which function as storage cells, and a coupling branch including a coupling cryotron. The storage cells of the superconducting learning matrix are activated in the learning phase in such a manner that the currents therein vary in accordance with a geometric series, and the storage cells switch the conductive state of the coupling cryotrons in the coupling branches in the stored phase, in order to change the coupling between the column and row lines at the intersections from a superconducting coupling to a normally conducting state. In a modification of the arrangement, the superconducting learning matrix may be provided with a blocking line coupled to the coupling cryotrons, so that activated storage cells switch the coupling branches from a normally conducting state during the learning process to a superconducting state in the stored phase.

In order to obtain dependence of the learning sequence in the learning phase upon experience, a learning matrix according to the invention may be operated to enhance the linkage between the column and row lines by activation of the superconducting storage cells with unipolar positive column pulses, and to inhibit the linkage by activating the cells with unipolar negative column pulses. The learning phase is completed, subsequent the activation of the storage cells, with the resultant production of a new linking state between the column and row lines. The stored phase of the matrix begins with the establishment of the new linking state, following which the learning matrix functions as a pure interpreting circuit.

In the arrangement according to the invention, the correlation between a property introduced to the matrix and a meaning stored in the matrix may be effected by providing means for determining an extreme value (e.g. extreme current or voltage). The extreme value identifies the most similar word or the most similar property with respect to information stored in the matrix, and the extreme value may constitute the largest or smallest sum of individual currents of the column or row lines added in the interrogated lines and columns, or the greatest or smallest sum of the voltages induced in the inductances of the corresponding coupling branches at the instant of interrogation.

The matrix of the present invention may also be arranged so that the coupling cells are in contradictory form, in order to classify the available information in binary form.

In order to reduce parasitic coupling between the row and column lines in the learning matrix according to the invention, the coupling inductance may be increased by providing holes under the coupling branches in the base plate, or by applying a highly permeable material, such as by evaporation, between the coupling branch and the base plate.

In another modification of the invention, the superconducting coupling cells coupling the column and row lines may be replaced by superconducting associative storage cells, whereby the function of an extreme value circuit, as above described, is accomplished by the word recognizing line. The activation of the associative storage cells of the superconducting learning matrix according to this embodiment of the invention is also effected in the form of a geometric series during the learning phase.

In a still further embodiment of the invention, each coupling cryotron of the working matrix may be coordinated with a complementary coupling cryotron of a complementary learning matrix. In this arrangement, a complementary write cryotron of the complementary matrix may be coordinated selectively with each write cryotron of the working matrix.

In another arrangement according to the invention, the coupling cryotrons may be designed to switch their conductive states automatically when a determined threshold value is attained, to thereby effect the exclusion of the respective column from interrogation.

In a still further embodiment of the invention, two additional switching cryotrons may be provided associated with each coupling cell, and arranged to be controlled by the respective storage cell to insure that a constant column current is supplied for each taught coupling cell.

The learning matrix according to the invention provides the advantage, in comparison with previous devices, in that, due to the matrix-like arrangement of the coupling cells, it is adaptable to integral production methods employing thin filmed techniques. This eliminates the complicated threading and wiring techniques required in the previous devices. The use of superconducting elements in the matrix also provides advantages. Specifically, by employing superconducting elements, the matrix of the present invention can have large storage capacity with low energy consumption, and due to the negligible thermal noise, an amplifier following the matrix can have a very high input sensitivity. As another advantage, the readout of the learning matrix in the stored phase is effected without destruction of the information, since the matrix operates in the stored phase as an interpreter circuit. As a further advantage, when the superconducting learning matrix according to the invention employs associative storage, the matrix can also identify disturbed words and characters which deviate in some bit positions from the learned information.

The learning matrix according to the invention has the additional advantage that the evaluation of a property introduced to the matrix is effected independently, or at least to a great extent independently, of the number of taught cells per column, due to the use of a special arrangement of complementary superconducting elements in a modification of the invention, so that the range of application of the learning matrix is greatly extended.

The invention will now be described in greater detail with reference to the accompanying drawings, in which.

Figure 1:
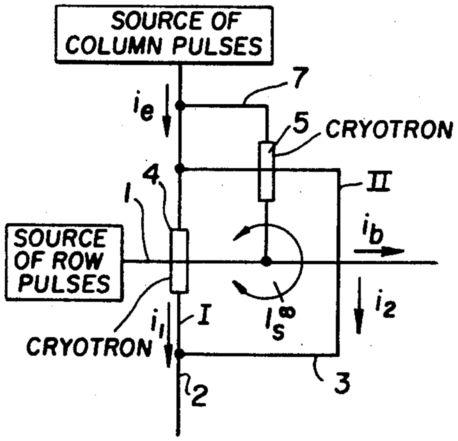
FIG. 1 is a circuit diagram illustrating one form of superconducting coupling cell according to the invention for coupling a column line to a row line.

Referring now to the drawings, and more in particular to FIG. 1, therein is illustrated one embodiment of a circuit according to the invention for use at an intersection of a learning matrix. The circuit, which is adapted to be operated under conditions under which the elements are superconductive, includes a row conductor 1 and a column conductor 2, with a write cryotron 4 connected in series with the column conductor 2 at the intersection. A cryotron is a switch that changes from the superconductive state to the resistive state in the presence of a magnetic field. Accordingly, the cryotron 4 is arranged to introduce a resistance in the column conductor 2 upon the application of a current exceeding a given magnitude to the row conductor 1. A storage cell 3 is connected to the column conductor 2 between opposite sides of the cryotron 4 whereby the storage cell 3 forms a superconducting permanent cell in combination with the cryotron 4 when the cryotron has a superconductive state. In the following disclosure, the current path for column conductor current $i_e$ which passes through the cryotron 4 will be referred to as current path I, and the current path for column conductor current which bypasses the cryotron and flows in the storage cell 3 will be referred to as current path II. Similarly, column conductor current flowing in the current path I will be referred to as current $i_1$ and column conductor current flowing in current path II will be referred to as current $i_2$. Current applied to the row conductor 1 is referred to as the current $i_b$ and current circulating in the superconducting permanent current cell will be referred to as the current $i_z$. Assumed current directions for the above currents are shown by the arrows associated therewith in FIG. 1.

In addition, the circuit of FIG. 1 includes a coupling branch 7 connected between the column conductor 2 and row conductor 1, and including a series cryotron 5 controlled by storage cell current, whereby current in the storage cell 3 exceeding a given magnitude switches a resistance in series in the coupling branch 7.

It will be understood, of course, that the representation of the circuit of FIG. 1 is intended merely to illustrate the electrical characteristics of the device, and is not intended to represent the actual construction thereof, the device being fabricated of superconductive elements according to known practice.

Figure 2:
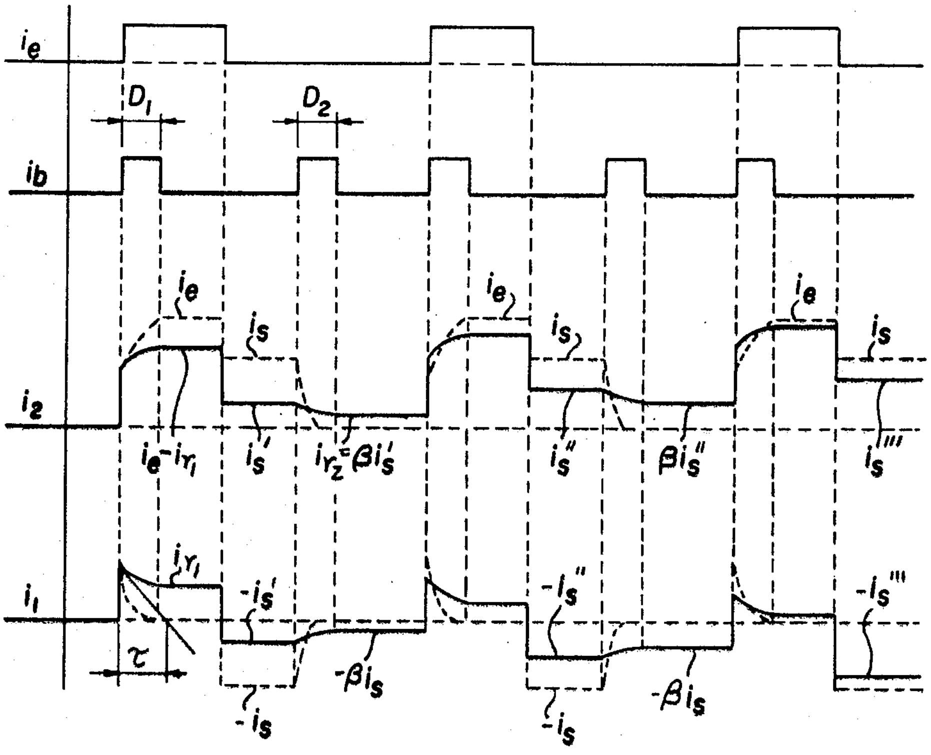
FIG. 2 is a pulse-time diagram for illustrating the manner of operation of the circuit of FIG. 1 in the learning process.

In order to more readily appreciate the invention, it will first be disclosed in simple qualitative terms with reference to the current-time diagram of FIG. 2, followed by a more rigorous explanation of the manner of operation thereof.

Referring to FIGS. 1 and 2, assume that a first series of current pulses $i_b$ is applied to the row conductor 1, and a second series of current pulses $i_e$ is applied to the column conductor 2, the pulses $i_e$ having greater pulse widths than the pulses $i_b$, and occurring only during alternate row pulses $i_b$. Assume also that there are no initial currents in the circuit, and that the current pulses $i_b$ have adequate magnitude to switch the cryotron 4 to a resistive state.

Upon the initial application of the pulses $i_e$ and $i_b$, the cryotron 4 is rendered resistive so that the column current $i_e$ is divided between paths I and II as currents $i_1$ and $i_2$ respectively. The current in the two paths at the end of the row pulse $i_b$ will be substantially maintained then throughout the remainder of the duration of the column pulse $i_e$. Upon the cessation of the column pulse $i_e$, the loop current $i_s$ will flow in the superconducting current cell, its amplitude being dependent upon the difference between the currents $i_1$ and $i_2$ at the cessation of the column pulse $i_e$. The circulating current in the superconducting cell is reduced upon the application of the second row pulse $i_b$ due to the introduction of resistance in the superconducting cell.

Upon the simultaneous application of the third row current pulse $i_b$ and the second column current pulse $i_e$ to the circuit, the column current once again divides between the current paths I and II. Since the currents thus applied to the two paths are superimposed upon the existing circulating current in the loop, it is apparent that the resultant current in each of the paths differs from that which occurred upon the first application of simultaneous pulses to the circuit. In other words, the information previously applied to the cell in the form of row and column pulses has preconditioned the circuit, the preconditioning or "learning" thereby resulting in a changed circulating current following the second application of coincident pulses to the circuit. In a similar manner it is apparent that the currents in the circuit subsequent the third group of simultaneous pulses are conditioned by the currents therein just prior to the application of row and column pulses. The current circulating in the loop is thus built up in the form of a geometric series. When the current circulating in the loop has attained a determined magnitude, adequate to switch the cryotron 5, a coupling will be established between the row conductor 1 and the column conductor 2. This condition will be hereinafter referred to as the "stored" state.

Referring in more detail to the pulse diagram of FIG. 2, it is apparent that the storage current $i_s$ stored in the cell is defined by $$i_s = i_2 = -i_1$$

only after the termination of the column pulse $i_e$. In a storage operation (as distinguished from a learning operation), the displacement of current from path I to path II is completed before the row pulse $i_b$ has terminated, since the pulse duration $D_1$, $D_2$ of the row pulses is much greater than the displacement time constant $$\tau = L_g/R$$

where $L_g$ denotes the inductence of storage cell 3 and R represents the gate resistance of write cryotron 4. This case is represented in FIG. 2 by dashed lines. In this case, it is apparent that "learning" by the storage cell 3 is not possible, since the storage of desired information is effected in a single step. The term "learning" as employed in this disclosure is an internal process of adaptive behavior change based upon experience, and is hence the adaptation to a changing environment. The learning process proceeds through quantitative changes of state in the learning phase to a qualitative change of state which corresponds to a "stored" phase.

Quantitative changes of state to effect a learning process is obtained according to the present invention by energizing the superconducting storage cell 3 in the manner represented in solid lines in FIG. 2. According to the invention, the activation of the cell is effected in such a manner that the displacement of the current from path I to path II is not complete at the time of termination of the row pulse $i_b$, so that a residual current $$i_1 = i_{r1} = \alpha i_s$$

continues to flow in path I, and a current $$i_2 = i_e - i_{r1}$$

flows in a path II, wherein $\alpha$ is a division factor. This result is achieved by selecting the pulse duration $D_1$ of the write pulse to be smaller than or substantially equal to the displacement time constant $\tau$. It is assumed, of course, that in practical operation the switching process is completed in a finite time. When the column pulse $i_e$ terminates, the storage current $i'_s$ remaining in the storage cell 3 during the learning process is defined as $$i'_s = i_s - i_{r1}$$

In the above description, the first illustrated row pulse $i_b$, which occurred in coincidence with a column pulse $i_e$, was denoted a "write" pulse. The second illustrated row pulse $i_b$, which has a duration $D_2$ and is not coincident with a column pulse $i_e$ is a "scanning read pulse". If the pulse duration $D_2$ of the scanning read pulse for reading out the circuit is selected to be smaller than the displacement time constant $\tau$, a residual current defined by $$i_2 = i_{r2} = \beta i'_s$$

remains in the cell after the termination of the scanning read pulse. The division factors $\alpha$ and $\beta$ are defined as $$\alpha = \frac{i_{r1}}{i_e} = e^{-D_1/\tau},\ \beta = \frac{i_{r2}}{i'_s} = e^{-D_2/\tau}$$

If the circuit of FIG. 1 is activated by row and column pulses in the manner illustrated in FIG. 2, with sequential alternate write and scanning read pulses applied to the row conductor, and unipolar column pulses applied to the column conductor in coincidence with the write pulses, a residual current $i_{r2}$ is added to the cell current $i'_s$ during the second cycle, so that a storage current $i''_s$ defined by $i_s'' = i_s' + \alpha\, i_{r2} = i_s' + \alpha\beta i_s'$ is produced. In the same manner, the storage current $i'''_s$ produced in the cell during the third cycle is composed of $i'_s$ and the $\alpha$, $\beta$ fold current $i''_s$ of the second cycle. It is thus apparent that, when unipolar column pulses are applied to the circuit of FIG. 1, in the $k$-th cycle an activated storage current $i^k_s$ results from the storage current $i'_s$ and the $\alpha$, $\beta$ fold current $i^{k-1}_s$ of the (k−1) cycle. The activated storage current $i^k_s$, when multiplied, represents a geometric series with $k$+1 members, which approaches the limiting value $i_{sup}$ $^-$ where $$i^{\infty}_{\mathrm{sup}} = i_s(1-\alpha)\lim_{n\to\infty}\sum_{0}^{k}(\alpha\beta)^k = i_s\frac{1-\alpha}{1-\alpha\beta}$$

where $\alpha$ and $\beta$ are less than 1, and $k$ approaches $\infty$. The subscript "sup" denotes the current $i_s$ with unipolar column pulse activation.

If the coupling cell of FIG. 1 is activated with alternate bipolar column pulses, in a manner similar to the operation with unipolar pulses, a geometric series is produced with alternating amplitudes for the activated storage current $i^k_s$ which approaches $$i^{\infty}_{sbp} = i_s(1-\alpha)\lim_{k\to\infty}\sum^{k}(-1)^k(\alpha\beta)^k = i_s\frac{1-\alpha}{1+\alpha\beta}$$

as a limiting value, as k → ∞. The subscript "sbp" denotes the cell current with activation by bipolar column pulses.

When the storage current $i^k_s$, during activation in the learning phase, attains or exceeds a predetermined thresehold, it establishes a new linking state between the column conductor and the row conductor by way of coupling cryotron 5. This establishes the "stored" phase.

If the coupling cryotron 5 is superconductive at the start of the learning process, storage cell 3, which is activated and thus taught in the learning phase, switches coupling cryotron 5 in the stored phase into the normally conducting state. In coupling cells which are not taught in the learning phase, the coupling cell 5 remains superconductive.

Figure 3:
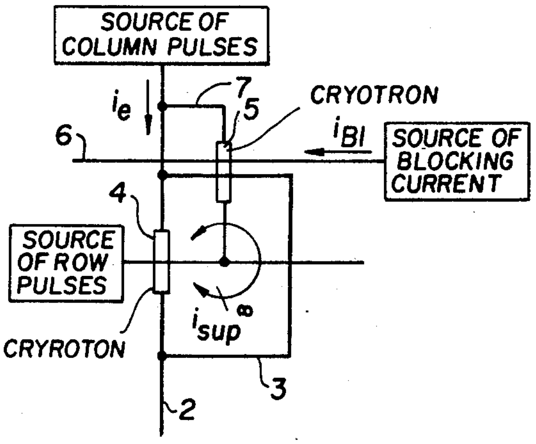
FIG. 3 is a circuit of a modification of the coupling cell of FIG. 1, in which a blocking line is included.

In a further embodiment of the invention, as illustrated in FIG. 3, the circuit of FIG. 1 is modified to provide a blocking line 6 coupled to the cryotron 5. In this arrangement, the coupling cryotron 5 is maintained in the normal conducting state at the start of the learning process by means of a current applied to the blocking line 6. This blocking is compensated in the learning phase with storage current $i_{sup}^-$ (activation with positive unipolar pulses), since the fields of the activation storage current $i_{sup}^-$ and of the blocking current $i_{B1}$ cancel each other, so that the coupling cryotron 5 is in the superconductive state in taught coupling cells. If, however, the activated storage current $i_{sup}^-$ flows only in the mathematically positive direction, as in the case of activation with negative unipolar pulses, the blocking action is increased, since the fields of the blocking current $i_{BL}$ and of the activated negative storage current $i_{sup}^-$ are additive.

In the same fashion as psychological learning processes, the function of the learning matrix in the stored phase depends upon its history, that is, upon the learning success. This learning success is stimulated by the coincidence of the property $e$ (applied to the column conductors) and the meaning $b$ (applied to the row conductors). The coincidence of the property e and of the meanings $b$ enhances the linkage, while the coincidence of the complement of the property $e$, that is, $e$, and of the meaning $b$ inhibits the linkage. The first condition is satisfied by activating the column lines with unipolar column pulses $i_e$. The activated storage current then approaches a maximum end value of $$i_{sup}^- = i_s\,(1-\alpha/1-\alpha\beta)$$

The latter condition, however, is satisfied when the column lines of the learning matrix are activated with bipolar pulses, with the property $e$ being expressed by a positive pulse, and the complement $e$ being expressed by a negative column pulse $i_e$. If the meaning b constantly coincides with the bipolar alternating property e and its complement $e$, the storage current activated with bipolar pulses will approach a minimum end value defined by the relationship $$i_{sbp} = i_s(1-\alpha/1+\alpha\beta)$$

If the meaning b continually coincides with the complement $e$, the storage current activated with unipolar pulses approaches a minimum end value of $-i_{sup}^-$. If the threshold for the switching coupling cryotron 5 is between the maximum end value and the above noted minimum end value, coupling cryotron 5 switches the storage current $i_{sup}^-$ (activated with unipolar pulses) into the new linking state $v_{max} = 1$, while the storage currents $i_{sbp}^-$ and $-i_{sup}^-$ (activated with bipolar and with negative unipolar pulses respectively) leave the coupling cryotron 5 in the old linking state $v_{min} = 0$.

Figure 4:
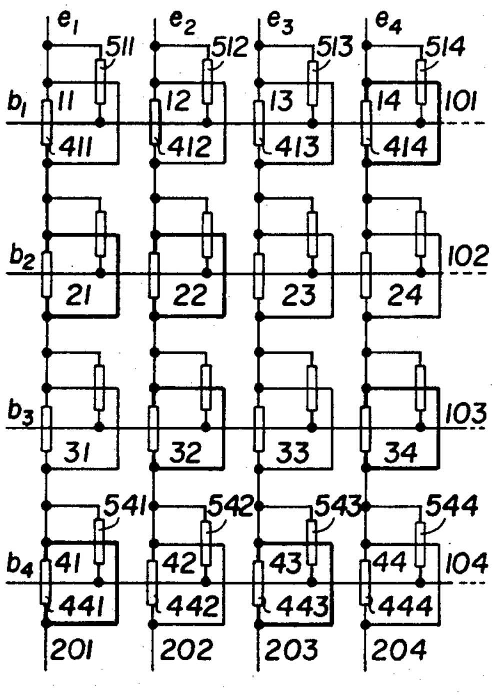
FIG. 4 is a circuit diagram of a learning matrix according to the invention, comprised of coupling cells according to FIG. 1.
Figure 6:
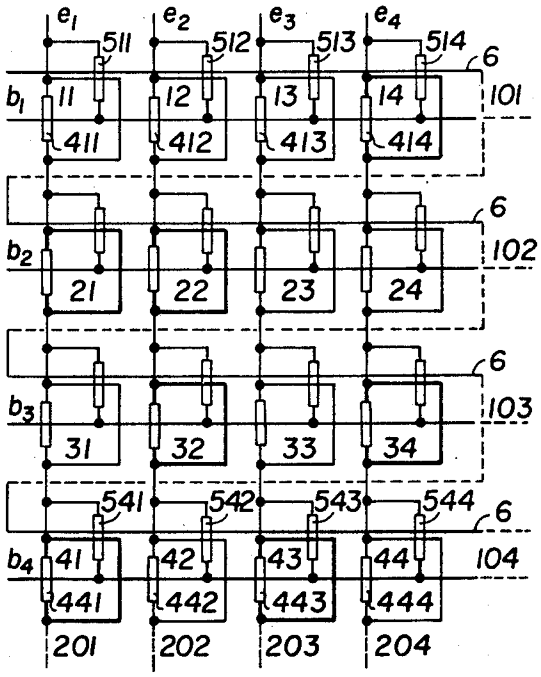
FIG. 6 is a circuit diagram of a learning matrix according to the invention, comprised of coupling cells of the form illustrated in FIG. 3.

Referring now to FIGS. 4 and 6, therein are illustrated learning matrices employing the coupling cells of FIGS. 1 and 3 respectively. In the stored phase of the coupling cells, these learning matrices realize, in known manner, a correlation between one set of properties $e$, represented by the column lines, and a set of meanings $b$, which are represented by the row lines. In the correlation, the difference between the offered information and the information stored in a corresponding row must be a minimum, this difference being the so called "hamming" difference. The property e most similar to the row line will then be identified. If the difference disappears completely, the correlation between the meaning and the property is unambiguous. This special case applies to associative storages. The minimum may be determined by means of an extreme value circuit. The correlation in the stored phase should be invertible or reversible. This requirement is met according to the present invention by employing linear elements as the linking elements between the row and column lines. In the disclosed embodiments of the invention, these linking elements are the gate resistance R and the coupling inductance Lg of the coupling cryotron 5.

Figure 5:
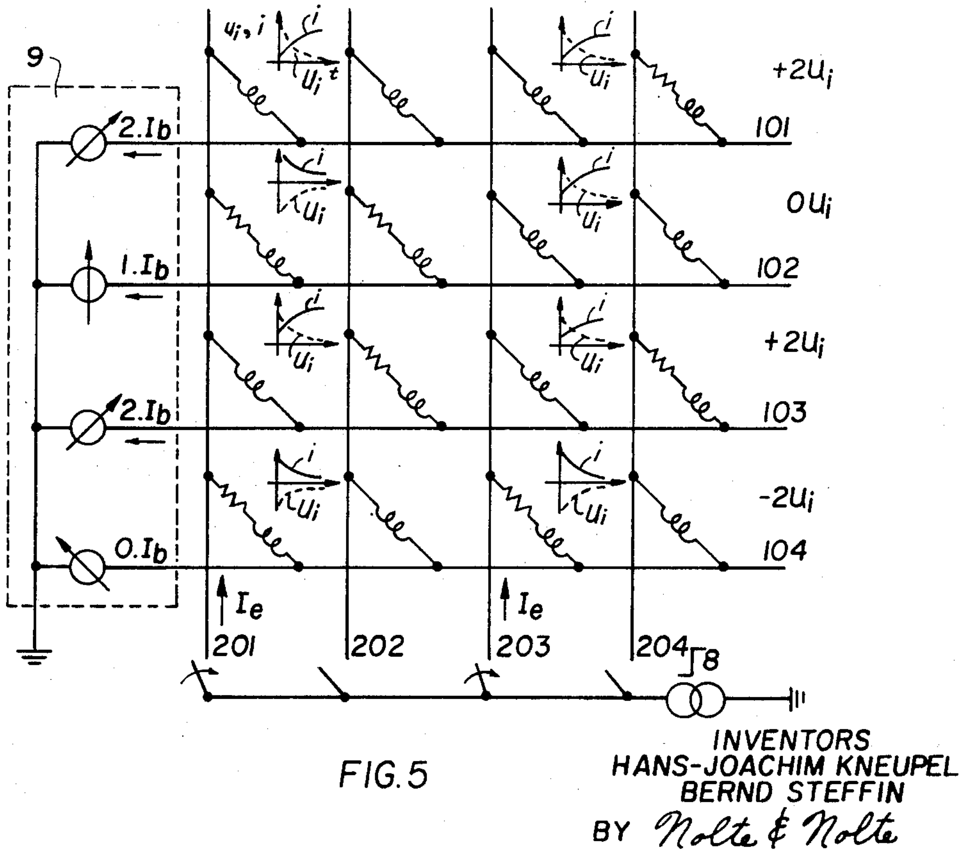
FIG. 5 is an equivalent diagram of the learning matrix of FIG. 4, for illustrating the dynamic behavior of the matrix.
Figure 7:
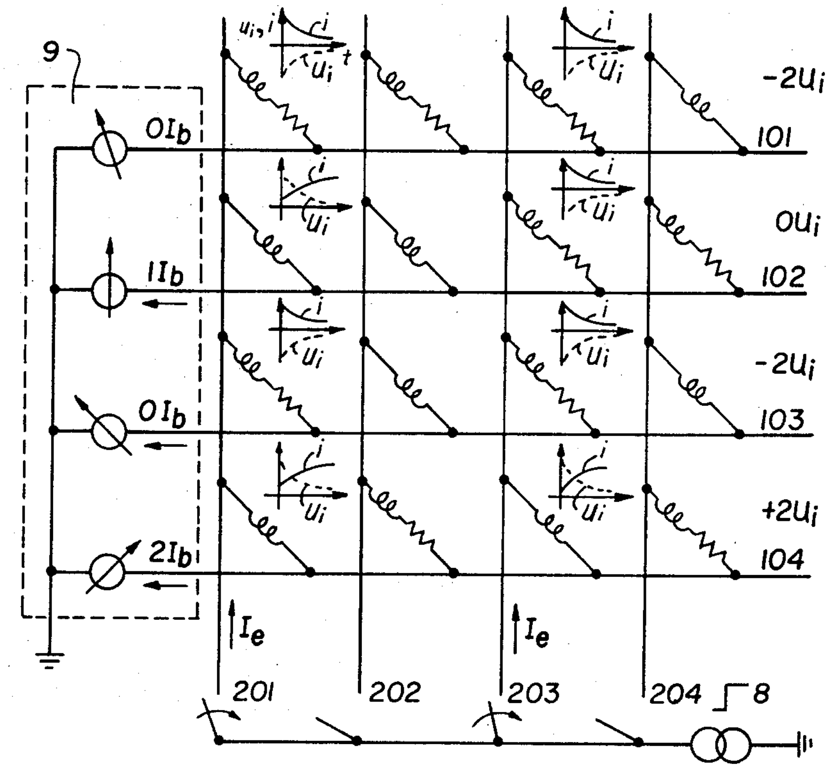
FIG. 7 is an equivalent circuit of the learning matrix of FIG. 6, for illustrating the dynamic behavior of the learning matrix.

The operation of a learning matrix according to the invention will now be described more completely with reference to FIGS. 4 through 7. The learning matrix of FIG. 4 employs the coupling cell of FIG. 1 at each intersection, and the learning matrix of FIG. 6 employs the coupling cell of FIG. 3 at each intersection. FIGS. 5 and 7 illustrate in simplified schematic form, the dynamic behavior of the matrices of FIGS. 4 and 6 respectively. FIGS. 4 and 6 each illustrate a matrix including 16 coupling cells. In order to simplify the nomenclature employed in FIGS. 4–7, the first number of each coupling cell numeral refers to the corresponding row, and the second number in the coupling cell numeral refers to the corresponding column conductor. Thus, coupling cells 11, 12, 13 and 14 correspond to the four columns of the first row. The row conductors are identified with three digit numerals, the first of which identifies the row conductor in accordance with the number employed in the circuits of FIGS. 1 and 3, and the last of which denotes the number of the row. The column conductors are similarly identified, with the first number corresponding to the column conductor identification 2 in FIGS. 1 and 3, and the last numeral denoting the number of the column. The write cryotrons are identified by three digit numerals, the first of which is 4, and the latter two corresponding to the identification of the coupling cell. Similarly, the coupling cryotrons are identified by three digit numerals, the first of which is 5, in accordance with the designation in FIGS. 1 and 3, and the latter two of which correspond to the numeral of the coupling cell.

The matrices of FIGS. 4 and 6 are adapted to correlate a four digit set of properties, in the form of signals $e_1$–$e_4$ applied to the column conductors 201–204 respectively, with a corresponding set of meanings in the form of signals $b_1$–$b_4$ applied to the row conductors 101–104 respectively. These signals are preferably in the form of the signals above described with reference to FIG. 2. The coupling cryotrons establish the connection of column, i.e. property, lines with the row, i.e. meaning, lines. The teaching of the coupling cells during the learning phase is effected by means of the write cryotrons in the manner above described with reference to FIGS. 1 and 3. The learning matrix illustrated in FIG. 6 is also provided with a blocking line 6 coupled in common to all of the coupling cryotrons, in accordance with the circuit of FIG. 3. The blocking line insures that, in contrast to the embodiment of FIG. 4, all coupling cryotrons are normally conducting at the start of a learning process.

Assume initially that the learning phase of the operation has been completed in each of the matrices of FIGS. 4 and 6 in the above-described manner, and that as a result of this learning process the coupling cells 14, 21, 22, 32, 34, 41 and 43 have been taught. The taught cells are identified in FIGS. 4 and 6 by heavier lines. In the arrangements of FIG. 4 and FIG. 6, the coupling cryotrons 514, 521, 522, 532, 534, 541 and 543 will consequently be in the normally conducting and superconducting state, respectively. In FIGS. 5 and 7, a solely superconductive connection between the column (property) and row (meaning) lines is represented by an inductance, while a normally conducting connection at an intersection is represented by a series connection of a resistance and an inductance. In the taught coupling cells 14, 21, 22, 32, 34, 41 and 43 in the embodiment of FIG. 5, the column and row lines are thus linked by the series connection of a resistance and an inductance, while the remaining connections are purely inductive. Due to the different manner of operation of the circuits of FIGS. 1 and 3, and hence the arrangements of FIGS. 4 and 6, purely inductive couplings at a given intersection in FIG. 5 are series connected resistance and inductance elements in the arrangement of FIG. 7, and vice versa.

When a current pulse from source 8 is selectively applied to the column conductors 201 and 203, the column currents $I_e$ in the coupling branches having only inductive coupling will increase from the time of the application of the pulse, and will decrease in the coupling branches having resistance, until these currents approach a constant end value in the steady state condition. In order to simplify the explanation of the system, it will therefore be assumed that a current flows in the steady state condition in the inductive linking branches, and that no current flows in the steady state in the branches which include series resistances. The untaught coupling cells 11, 13, 23, 31 and 33 in the embodiment of FIG. 5, and the taught coupling cells 21, 41 and 43 in the embodiment of FIG. 7 will then contribute to the corresponding row current $I_b$. The taught coupling cells 21, 41 and 43 in the embodiment of FIG. 5 do not contribute to the respective row currents. If the sum of the currents in a given row contributed by the column currents has an extreme (maximum or minimum) value, the difference between the offered property $e$, represented by column currents $I_e$, and the meaning $b$ to be found, represented by row currents $I_b$, is a minimum and the correlation is thus obtained. In the arrangement of FIG. 5, the property $e$ to be found is classified by a minimum current in row line 104, and in the arrangement of FIG. 7 by a maximum in row line 104, and the property $e$ is thus correlated with the meaning $b_4$. This extreme value may be determined by means of a suitable extreme value circuit 9, which may include any suitable conventional means for detecting or indicating extreme absolute or relative currents. The extreme values may also detected, if desired, by detecting the voltages $U_{ik}$ induced in the individual coupling circuits at the time of application of the pulses from source 8 to the column conductors. These voltages $U_{ik}$, denoted in FIGS. 5 and 7 by dashed lines, are positive for positive current changes, and negative for negative current changes. The correlation is then realized in the arrangement of FIG. 5 by a minimum value, and in the arrangement of FIG. 7 by a maximum value in row line 104, so that the offered property is identical to the meaning $b_4$.

If the set of properties e is present in binary form, the column lines must be arranged "contradictorally." This means that a separate column line with respective coupling cells must be coordinated with each of the binary digits 0 and 1.

In order to assure that the inductive linkages existing initially during the learning phase in the learning matrix according to the arrangement of FIG. 4 does not interfere with the learning process, and in order to avoid insofar as possible the undesired parasitic couplings between the row and column lines in the stored phase, the linking inductance must be much greater than the inductance of the row and column lines. This requirement may be met if either the coupling branch 7 is designed as an unshielded line, with a hole in the base plate of the device under the coupling branch 7, or if a highly permiable magnetic material is applied between the coupling branch 7 and the base plate, for example, by evaporation techniques.

Figure 8:
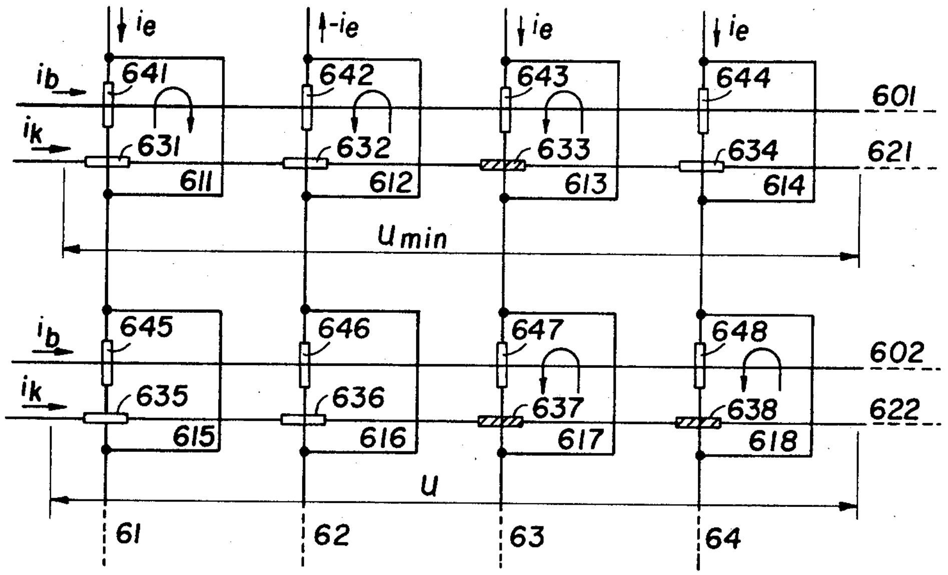
FIG. 8 is a circuit diagram of a modification of a learning matrix according to the invention, in which the matrix is comprised of associative storage cells.

FIG. 8 illustrates a modification of the learning matrix according to the invention in which galvanic coupling between the row and column lines is avoided by employing known associative storage techniques in the form of the superconducting learning matrix. In the embodiment of FIG. 8, row line 601 controls the cryotrons 641–644 in series with column conductors 61–64 respectively, and a second row line 602 controls cryotrons 645–648 also in series in the column conductors 61–64 respectively. Storage cells 611–618 are connected to the cryotrons 641–648. Word recognizing cryotrons 631–638 are controlled by currents in the column conductors in the superconductive cells 611–618 respectively, with the cryotrons 631–634 being connected in series in a stored phase line 621, and cryotrons 635–638 being connected in series in a stored phase line 622.

The activation and teaching of the associative storage cells 611–618 is effected in the manner above-described with respect to FIG. 1 by means of the write cryotrons 641–648, which are controlled by the current pulses $i_b$ in the "learning phase" row lines 601 and 602. In the stored phase, the activated bipolar or unipolar storage current $i_s^-$ is then stored in the taught associative storage cells. In the explanation of the circuit of FIG. 8, the general case of bipolar operation is assumed, and it is assumed for example that the taught cells are associative storage cells 611, 612, 613, 617 and 618. In the associative storage cells 612, 613, 617 and 618, the storage current $i_{sbp}^-$ (activation with bipolar pulses) flows in the mathematically positive direction, and in the associative storage cell 611 the current flows in the mathematically negative direction. During the interrogation of the superconductive learning matrix of FIG. 8, a positive column current pulse $i_e$ is applied to the column lines 61, 63 and 64, and a negative column current is applied to the column line 62, as indicated by the arrows on the respective column lines. These interrogation currents are in the same direction as the activated storage circuits $i_{sbp}$ in the taught associative storage cells 613, 617 and 618, and the sum of the currents is adaquate to switch the corresponding word recognizing cryotrons 633, 637 and 638 into the normal conducting state. In the taught associative storage cells 611 and 612, however, the interrogation currents are opposed to activated storage currents, so that the word recognizing cryotrons 631 and 632 are switched to the superconducting state. The stored phase row lines 621 and 622 serve the function of word recognizing lines in associative storages. In the arrangement according to the present invention, these lines are employed for the determination of extreme values, by determining the minimum voltage drop $U_{min}$ over the normally conducting word recognizing cryotrons of the stored phase row line when a direct current $i_k$ is applied thereto. The minimum voltage drop $U_{min}$ provides the best correlation between the learned and interrogated word, and consequently identifies the desired word. In the present example, this identification is established in the stored phase row line 621, in which the voltage drop $U_{min}$ appears only across the normally conducting word recognizing cryotron 633. In the stored phase row line 622, there are two voltage drops across word recognizing cryotrons, i.e., the voltage drops across the two normally conducting word recognizing cryotrons 637 and 638. As opposed to associative storage arrangements, the superconducting learning matrix according to the invention can thus also identify disturbed words and characters which differ in some bit positions from the learned words and characters.

Figure 9:
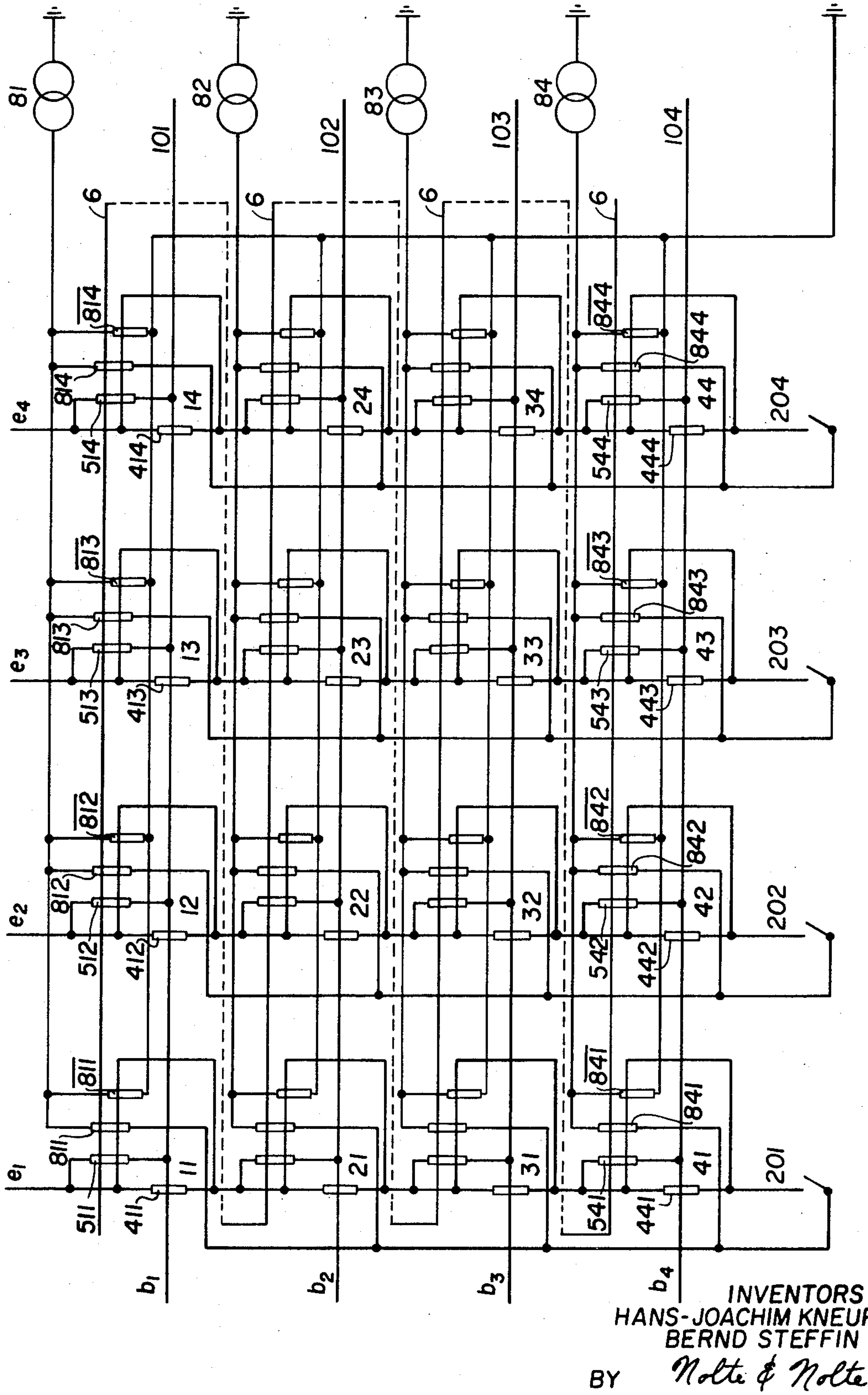
FIG. 9 is a circuit diagram of a modification of the learning matrix of FIG. 6, in which each coupling cell includes two additional switching cryotrons.

FIG. 9 illustrates a learning matrix which is a modification of the matrix of FIG. 6. In this arrangement, the circuit at each intersection is provided with two additional cryotrons. The first of these is identified for convenience by a three digit numeral, the first number of which is 8, the latter two of which correspond to the numeral of the coupling cell. The second additional cryotron at each intersection is identified as the complement of the first additional cryotron. In each coupling cell, the first additional switching cryotron is controlled by the current in the superconductive cell and the current in the blocking line 6, so that these additional cryotrons have the same switching state as the coupling cryotron in the corresponding cell. The second additional switching cryotrons are coupled only to the superconductive cells, so that these cryotrons are in the complementary switching state with respect to the first additional cryotrons. Thus, for example, in coupling cell 11 the first additional switching cryotron 811 will have the same switching state as the coupling cryotron 511, and the second additional cryotron $\overline{\mathbf{811}}$ will have the complementary switching state. It is thus apparent that, in an activated taught coupling cell, in which the field of the blocking current of the blocking line 6 is compensated, the coupling cryotron and the first additional switching cryotron will be switched to the superconducting state, while the complementary switching cryotron will remain in the normally conducting state, since the field of the activated current of the storage cell is not compensated by the field of the blocking current. In the untaught cells, however, the coupling cryotrons and first additional switching cryotrons will be normally conductive, while their respective complementary cryotrons will be in the superconductive state. In the arrangement of FIG. 9, current generators 81, 82, 83 and 84 are provided, with a separate current generator being connected to all of the additional cryotrons provided in a given row. The other ends of the complementary cryotrons are connected in common to a reference point, while the other ends of the first additional cryotrons associated with each column are interconnected for connection, by way of selective switch means, to the corresponding column conductor. In this arrangement, constant column current, from the current generators, is applied only to the taught coupling cells.

The additional cryotrons 811–844 in combination with the corresponding complementary additional cryotrons $\overline{\mathbf{811}}$–$\overline{\mathbf{844}}$, enable the application of a constant column current to each taught element. This will be illustrated further with an example.

Assume initially that the current is applied directly to the corresponding column lines and the cryotrons 811, $\overline{\mathbf{811}}$–844, $\overline{\mathbf{844}}$ as well as the current sources 81–84 are not present, as in the arrangement of FIG. 6. Assume further, that by way of the example in column 201 all four coupling cells 11, 21, 31, 41, in column 202 one coupling cell 12, in column 203 three coupling cells 13, 24, 43 and in column 204 two coupling cells 14, 44 are taught. As is known the coupling cryotrons in the taught cells are superconductive. Then by applying a constant column current $I_{col}$ currents of $i_{col}/4$ in column 201, $I_{col}$ in column 202, $I_{col}/3$ in column 203 and $I_{col}/2$ in column 204 would flow per coupling cell. A certain property would therefore be differently evaluated by the various coupling cells, namely, in dependence of the number of taught cells. The contribution to the row current of row 101 ($b_1$) for instance, by coupling cell 11 would be, $I_{col}/4$ and $1 \cdot I_{col}$ by coupling cell 12.

In order to avoid this usually undesirable effect, constant current feeding must be employed. This is provided in the matrix as shown in FIG. 9. The complementary arrangement of the additional cryotrons 811, $\overline{\mathbf{811}}$–844, $\overline{\mathbf{844}}$ guarantees a constant current feeding $I_{con}$ per taught coupling cell. Assume again that in column 201 all four, in column 202 one, in column 203 three and in column 204 two coupling cells are taught and hence their corresponding coupling cryotrons are superconductive. Since the additional cryotrons have the same switching stage as the coupling cryotrons 511–544, currents of $4{\cdot}I_{con}$ in column 201, of $I_{con}$ in column 202, of $3{\cdot}I_{con}$ in column 203 and $2{\cdot}I_{con}$ in column 204 would flow accordingly.

These column currents divide in the number of taught cells: currents $4{\cdot}I_{con}$ of column 201 in four, $I{\cdot}I_{con}$ in column 202 in one, $3{\cdot}I_{con}$ in column 203 in three and $2{\cdot}I_{con}$ in column 204 in two taught cells, so that a constant current always flows per taught cell.

Figure 10:
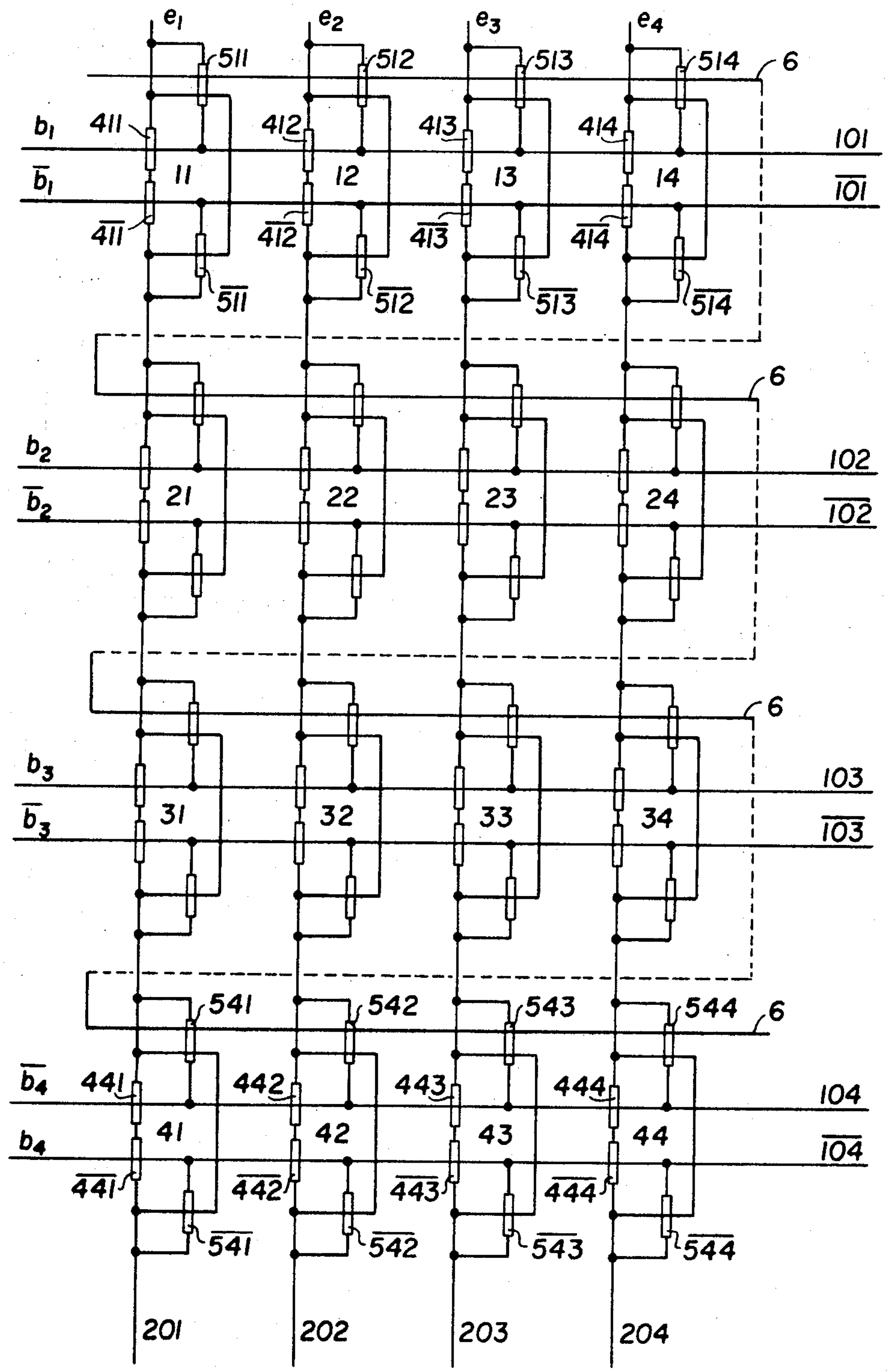
FIG. 10 is a circuit diagram of another modification of the learning matrix of FIG. 6, in which the working matrix includes complementary coupling cells.

FIG. 10 illustrates a complementary learning matrix. In this arrangement, which is also a modification of the matrix of FIG. 6, an additional complementary matrix is provided. Thus, each storage cell is provided with a complementary write cryotron in series with the corresponding column conductor, and controlled by a corresponding complementary write line, and each storage cell is also provided with a complementary coupling cryotron connected between the complementary write line and the corresponding column line. For example, in the storage cell 11, the complementary write cryotron $\overline{\mathbf{411}}$ is connected in series with the write cryotron 411 and it is controlled by the complementary row write line $\overline{\mathbf{101}}$, the coupling cryotron 511 is connected between the write row line 101 and the column line 201 of the write cryotron 411, and coupled to superconductive loop, while the complementary coupling cryotron $\overline{\mathbf{511}}$ is connected between the complementary write row line $\overline{\mathbf{101}}$ and the column conductor 201 below the complementary write cryotron $\overline{\mathbf{411}}$ and also controlled by the superconductive loop. The blocking line 6 also controls the coupling cryotrons as in the manner of FIG. 6, but does not control the complementary coupling cryotrons. The learning matrix of FIG. 10 thus includes the learning matrix of FIG. 6, with an additional complementary learning matrix therein. The learning matrix of FIG. 10 can be taught in the learning phase by means of the original and complementary write cryotrons and can be read out in the stored phase by means of the original cryotrons and the complementary coupling cryotrons alternately, in one form as a working matrix, or in the other form as a complementary matrix. Complementary operation is not necessary in the learning phase, so this operation may be confined to one of the two write cryotrons in each storage cell. In the stored phase, however, the complementary arrangement of the original and complementary cryotrons provides the result that the same column current flows into the cell, independently of its state.

In the learning matrices of both of FIGS. 9 and 10, the application of a constant column current to a coupling cell provides the desirable effect that the evaluation of a property is independent of the number of taught coupling cells. This prevents the occurance of the undesirable case in which a property which appears only once is given the highest evaluation, resulting in many cases in undesirable increases in contrast in the correlations.

In some cases, in order to exclude the worst cases, it is sufficient to dimension the coupling cryotrons so that they disconnect automatically when a determined threshold current flowing through a coupling branch is exceeded. This technique prevents unfavorable distributions of the taught cells. All coupling cryotrons of a column are then disconnected, while the respective property is not significant in the evaluation, and is excluded from interrogation for all practical purposes. This technique is admissable if the hamming difference is made sufficiently large, and if it can be assumed that the probability that the worst case will appear at the same time in several columns is very low.

What is claimed is:

1. A method of teaching a storage cell of a superconducting learning matrix of the type having a cryotron in series in said storage cell, comprising applying a control pulse sequence to said cryotron for changing the state of said cryotron from superconductive to normal resistance, and applying a second current pulse sequence to said cell which divides between a first path in said cell including said cryotron and a second path in said cell which does not include said cryotron, the duration of the pulses of said control pulse sequence being no greater than the displacement time constant $L_g/R$, where $L_g$ is the inductance of said cell and R is the gate resistance of said cryotron, and said second current pulses have longer duration than said control pulses, at least some of said control pulses occurring simultaneously with said second pulses, whereby current stored in said cell following the pulses of said pulse sequences varies in a stepwise manner as a geometric series function which varies in a sense dependent upon the polarity of the pulses of the second pulse sequence and independent of the polarity of the pulses of the first pulse sequence.

2. A superconducting learning matrix comprising a superconducting matrix having a plurality of row and column lines with separate coupling cells at the intersections thereof, each coupling cell comprising a storage cell, a coupling branch including a coupling cryotron coupled to said storage cell, whereby the conductive state of said cryotron is a function of current in said storage cell, means applying pulse currents to said row and column lines, and means responsive to currents in said row and column lines for varying the amplitude of current in said storage cell in a stepwise manner as a geometric series function which varies in a sense dependent upon the polarity of pulses applied to said column lines and independent of the polarity of pulses applied to said row lines, said coupling cryotrons being responsive to change their conductive states upon the occurrence in the respective cells of a current greater than the current which can be stored therein solely in response to a single column pulse.

3. The superconducting learning matrix of claim 2 wherein said means responsive to currents in said row and column lines comprises a write cryotron in series in the corresponding column line and forming part of said storage cell, said write cryotron being connected for control by current in the corresponding row line.

4. The superconducting learning matrix of claim 3 comprising means for connecting said coupling branch between the corresponding row and column lines.

5. The superconducting learning matrix of claim 3 wherein each row of said matrix further comprises a separate word recognizing line, the coupling cryotrons of each row of said matrix being connected in series with the word recognizing line of the corresponding row, means applying interrogation currents to said column lines, whereby the resistance of the coupling cryotrons in each word recognizing line is a function of the interrogation currents and the currents stored in the corresponding storage cells.

6. The superconducting learning matrix of claim 3 wherein said matrix further includes a blocking line connected to control said coupling cryotrons.

7. The superconducting learning matrix of claim 3 wherein said means responsive to currents further comprises means for applying a control pulse sequence to said row lines, and means applying a second current pulse sequence to said column lines, the duration of the pulses of said control pulse series being no greater than the displacement time constant $L_g/R$, where $L_g$ is the inductance of said storage cell and R is the gate resistance of said write cryotron, said second current pulses having longer durations than said control pulses and occurring simultaneously with at least some of said control pulses.

8. The superconducting learning matrix of claim 3 further comprising a complementary coupling cryotron coupled to each storage cell and a complementary write cryotron connected to each storage cell, said complementary coupling cryotrons and complementary write cryotrons being interconnected to form a complementary matrix.

9. The superconducting learning matrix of claim 3 wherein said coupling cryotrons are dimensioned to switch automatically to a different conducting state when a predetermined threshold current in the corresponding storage cell is exceeded, for excluding the respective column of said matrix from interrogation.

* * * * *